(12) United States Patent
O'Neill et al.

(10) Patent No.: US 10,691,885 B2
(45) Date of Patent: Jun. 23, 2020

(54) EXTRACTING STRUCTURED DATA FROM HANDWRITTEN AND AUDIO NOTES

(71) Applicant: EVERNOTE CORPORATION, Redwood City, CA (US)

(72) Inventors: Chris O'Neill, Burlingame, CA (US); Andrew Malcolm, Redwood City, CA (US); Alexander Pashintsev, Cupertino, CA (US); Eugene Livshitz, San Mateo, CA (US); Boris Gorbatov, Sunnyvale, CA (US); Natalia Galaktionova, Moscow (RU); Ilya Buryak, Moscow (RU)

(73) Assignee: EVERNOTE CORPORATION, Redwood City, CA (US)

( * ) Notice: Subject to any disclaimer, the term of this patent is extended or adjusted under 35 U.S.C. 154(b) by 524 days.

(21) Appl. No.: 15/475,001

(22) Filed: Mar. 30, 2017

(65) Prior Publication Data

US 2017/0286529 A1 Oct. 5, 2017

Related U.S. Application Data

(60) Provisional application No. 62/315,137, filed on Mar. 30, 2016.

(51) Int. Cl.
*G06F 16/00* (2019.01)
*G06F 40/186* (2020.01)
*G06F 40/279* (2020.01)

(52) U.S. Cl.
CPC .......... *G06F 40/186* (2020.01); *G06F 40/279* (2020.01)

(58) Field of Classification Search
CPC ........................... G06F 17/248; G06F 17/2765
USPC .......................................................... 707/722
See application file for complete search history.

(56) References Cited

U.S. PATENT DOCUMENTS

| 6,285,785 | B1 * | 9/2001 | Bellegarda | G06K 9/00 382/187 |
| 7,657,424 | B2 * | 2/2010 | Bennett | G09B 5/04 704/9 |
| 7,801,896 | B2 * | 9/2010 | Szabo | G06F 21/6245 707/739 |
| 9,442,928 | B2 * | 9/2016 | Szucs | G06F 16/93 |
| 9,824,084 | B2 * | 11/2017 | Zelenkov | G06F 17/271 |
| 10,176,167 | B2 * | 1/2019 | Evermann | G06F 17/279 |
| 2005/0038781 | A1 * | 2/2005 | Ferrari | G06F 16/3344 |
| 2006/0004743 | A1 * | 1/2006 | Murao | H04N 7/17318 |
| 2007/0239760 | A1 * | 10/2007 | Simon | G06Q 10/06 |

(Continued)

*Primary Examiner* — Hanh B Thai
(74) *Attorney, Agent, or Firm* — Morgan, Lewis & Bockius LLP (57) ABSTRACT

This application is directed to recognizing unstructured information based on hints provided by structured information. A computer system obtains unstructured information collected from a handwritten or audio source, and identifies one or more terms from the unstructured information. The one or more terms includes a first term that is ambiguous. The computer system performs a recognition operation on the first term to derive a first plurality of candidate terms for the first term, and obtains first contextual information from an information template associated with the unstructured information. In accordance with the first contextual information, the computer system selects a first answer term from the first plurality of candidate terms, such that the first term is recognized as the first answer term.

18 Claims, 7 Drawing Sheets

(56) References Cited

U.S. PATENT DOCUMENTS

| | | | | |
|---|---|---|---|---|
| 2008/0141117 A1* | 6/2008 | King | G06Q 30/02 | 715/238 |
| 2010/0241469 A1* | 9/2010 | Weigert | G06F 8/75 | 717/124 |
| 2010/0306249 A1* | 12/2010 | Hill | G06Q 30/02 | 707/769 |
| 2011/0125734 A1* | 5/2011 | Duboue | G09B 7/00 | 707/723 |
| 2012/0084293 A1* | 4/2012 | Brown | G06F 16/24522 | 707/741 |
| 2012/0197939 A1* | 8/2012 | Ben Shahar | G06F 16/319 | 707/780 |
| 2014/0278379 A1* | 9/2014 | Coccaro | G10L 15/1822 | 704/202 |
| 2014/0361983 A1* | 12/2014 | Dolfing | G06F 3/04883 | 345/156 |
| 2014/0363074 A1* | 12/2014 | Dolfing | G06K 9/00979 | 382/156 |
| 2014/0363082 A1* | 12/2014 | Dixon | G06K 9/00402 | 382/187 |
| 2014/0365949 A1* | 12/2014 | Xia | G06K 9/00436 | 715/780 |
| 2015/0046782 A1* | 2/2015 | O'Donoghue | G06F 40/103 | 715/205 |
| 2015/0186514 A1* | 7/2015 | Singh | G06F 16/951 | 707/709 |
| 2015/0186528 A1* | 7/2015 | Rao | G06F 16/9535 | 707/710 |
| 2015/0279366 A1* | 10/2015 | Krestnikov | H04W 4/70 | 704/235 |
| 2015/0348551 A1* | 12/2015 | Gruber | G06F 17/2705 | 704/235 |
| 2015/0363485 A1* | 12/2015 | Bennett | G06F 16/3325 | 707/694 |
| 2016/0092434 A1* | 3/2016 | Bellegarda | G06F 17/279 | 704/9 |
| 2016/0179934 A1* | 6/2016 | Stubley | G06N 5/00 | 707/722 |
| 2016/0357728 A1* | 12/2016 | Bellegarda | G06F 17/275 | |

* cited by examiner

EXTRACTING STRUCTURED DATA FROM HANDWRITTEN AND AUDIO NOTES

RELATED APPLICATION

This application claims priority to U.S. Provisional Application No. 62/315,137, filed Mar. 30, 2016, entitled "Extracting Structured Data from Handwritten and Audio Notes," which is hereby incorporated by reference in its entirety.

TECHNICAL FIELD

This relates generally to extracting unstructured data from a handwritten or audio note for filling a structured data template.

BACKGROUND

Personal and corporate content are dominated by unstructured data. According to various estimates, from 70-90 percent of all usable data in organizations is represented by unstructured information. Flexible capturing of unstructured data in a variety of formats has been greatly facilitated by the development of universal content management systems, such as the Evernote software and cloud service developed by the Evernote Corporation of Redwood City, Calif. In parallel with typed text entry, documents and web clips, contemporary content collections can include handwritten notes taken on a variety of electronic devices, such as tablets running various operating systems, on regular or special paper via intelligent pen & paper solutions, on conventional whiteboards and smart walls, and interactive displays, as well as scanned from traditional paper notes taken on legacy pads, bound notebooks, etc. Similarly, audio notes, including voice transcripts, are increasingly recorded on smartphones, tablets, specialized conferencing systems, home audio systems, wearable devices such as intelligent watches, and other recording hardware. Some models of intelligent pens are also capable of capturing and synchronizing handwritten and voice recordings.

A significant prevalence of unstructured data over the organized information (represented by a majority of database content, by forms, tables, spreadsheets and many kinds of template-driven information) poses a major productivity challenge and an impediment to efficient productivity workflow. Mainstream productivity systems used in sales, CRM (Customer Relationship Management), project management, financial, medical, industrial, civil services and in many other areas are based on structured data represented by forms and other well-organized data formats. Manual conversion of freeform, unstructured information obtained in the field, in the office, at meetings and through other sources into valid data for productivity systems (for example, entering sales leads data into CRM software) takes a significant time for many categories of workers and negatively affects job efficiency.

In response to this challenge, a sizable amount of research and R&D work has been dedicated to creating methods and systems for automatic and semi-automatic conversion of unstructured data into structured information. NLP (Natural Language Processing) and various flavors of data mining, NER (Named Entity Recognition for detecting personal, geographic and business names, date & time patterns, financial, medical and other "vertical" data) and NERD (NER+ Disambiguation), together with other AI and data analysis technologies have resulted in general purpose and specialized, commercial and free systems for automatic analysis and conversion of unstructured data.

Notwithstanding advances in facilitating unstructured data analysis and conversion into structured information, many challenges remain. For example, automatic recognition (conversion to text, transcription) of handwritten and voice data results in multi-variant answers where each word may be interpreted in different ways (e.g. 'dock' and 'clock' may be indistinguishable in handwriting and it may be difficult to tell 'seventy' from 'seventeen' in a voice note); even word segmentation may be uncertain (e.g., a particular sound chunk might represent one word or multiple different two word arrangements), which may prevent or complicate instant application of known data analysis methods.

Accordingly, it is desirable to develop methods and systems for automatic conversion of unstructured handwritten and audio data into structured information.

SUMMARY

In accordance with one aspect of the application, a method is implemented at a computer system having one or more processors and memory storing one or more programs executed by the one or more processors. The computer-implemented method includes obtaining unstructured information collected from a handwritten or audio source, and identifying one or more terms from the unstructured information, the one or more terms including a first term that is ambiguous. The computer-implemented method further includes performing a recognition operation on the first term to derive a first plurality of candidate terms for the first term, and obtaining first contextual information from an information template associated with the unstructured information. The computer-implemented method further includes in accordance with the first contextual information, selecting a first answer term from the first plurality of candidate terms, such that the first term is recognized as the first answer term.

In another aspect of the invention, a computer systems includes one or more processors, and memory having instructions stored thereon, which when executed by the one or more processors cause the server to perform operations including obtaining unstructured information collected from a handwritten or audio source, and identifying one or more terms from the unstructured information, the one or more terms including a first term that is ambiguous. The instructions stored in the memory of the computer system, when executed by the one or more processors, cause the processors to further perform operations including performing a recognition operation on the first term to derive a first plurality of candidate terms for the first term, and obtaining first contextual information from an information template associated with the unstructured information. The instructions stored in the memory of the computer system, when executed by the one or more processors, cause the processors to further perform operations including in accordance with the first contextual information, selecting a first answer term from the first plurality of candidate terms, such that the first term is recognized as the first answer term.

In accordance with one aspect of the application, a non-transitory computer-readable medium, having instructions stored thereon, which when executed by one or more processors cause the processors of a computer system to perform operations including obtaining unstructured information collected from a handwritten or audio source, and identifying one or more terms from the unstructured information, the one or more terms including a first term that is ambiguous. The instructions stored in the memory of the computer system, when executed by the one or more processors, cause the processors to further perform operations including performing a recognition operation on the first term to derive a first plurality of candidate terms for the first term, and obtaining first contextual information from an information template associated with the unstructured information. The instructions stored in the memory of the computer system, when executed by the one or more processors, cause the processors to further perform operations including in accordance with the first contextual information, selecting a first answer term from the first plurality of candidate terms, such that the first term is recognized as the first answer term.

Other embodiments and advantages may be apparent to those skilled in the art in light of the descriptions and drawings in this specification.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

Like reference numerals refer to corresponding parts throughout the several views of the drawings.

DESCRIPTION OF IMPLEMENTATIONS

The proposed system analyzes a template of structured information, such as a form, builds a lexical and phonetic space representing potential spelling and writing of template units (form fields) and the corresponding values (for example, personal or company names), including synonyms and abbreviations, and maps multi-variant answers obtained by handwriting and voice recognition systems onto structured information by retrieving relevant answer variants, building direct and reverse structural attachment tokens and hints, and by resolving conflicts via cross-validation and sequential analysis of tokens and hints. Unresolved structural attachments may be presented to a decision maker as a semi-completed template with multiple options for a final choice.

Conversion between unstructured and structured information may be time consuming because of a necessity to analyze large quantities of normative data. A positive factor for developing such data conversion systems is a frequent availability of an offline functioning mode for the proposed system. For example, converting sales person's notes into Salesforce forms may be deferred and doesn't normally require instant participation of a user. This allows employing extensive computing resources, including distributed cloud-based systems, functioning in off-peak hours.

Figure 1:
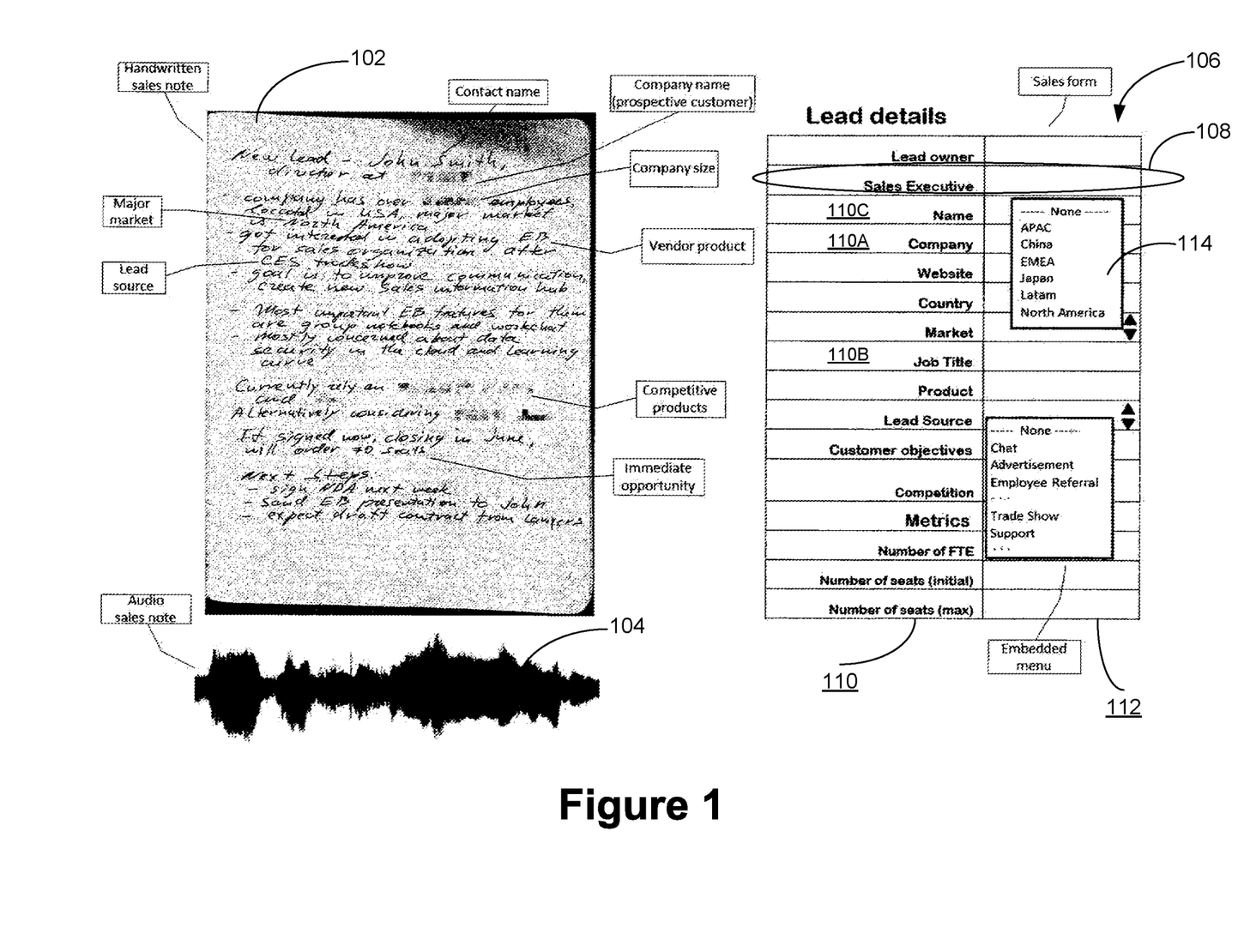
FIG. 1 is a schematic illustration of unstructured and structured datasets.
Figure 2:
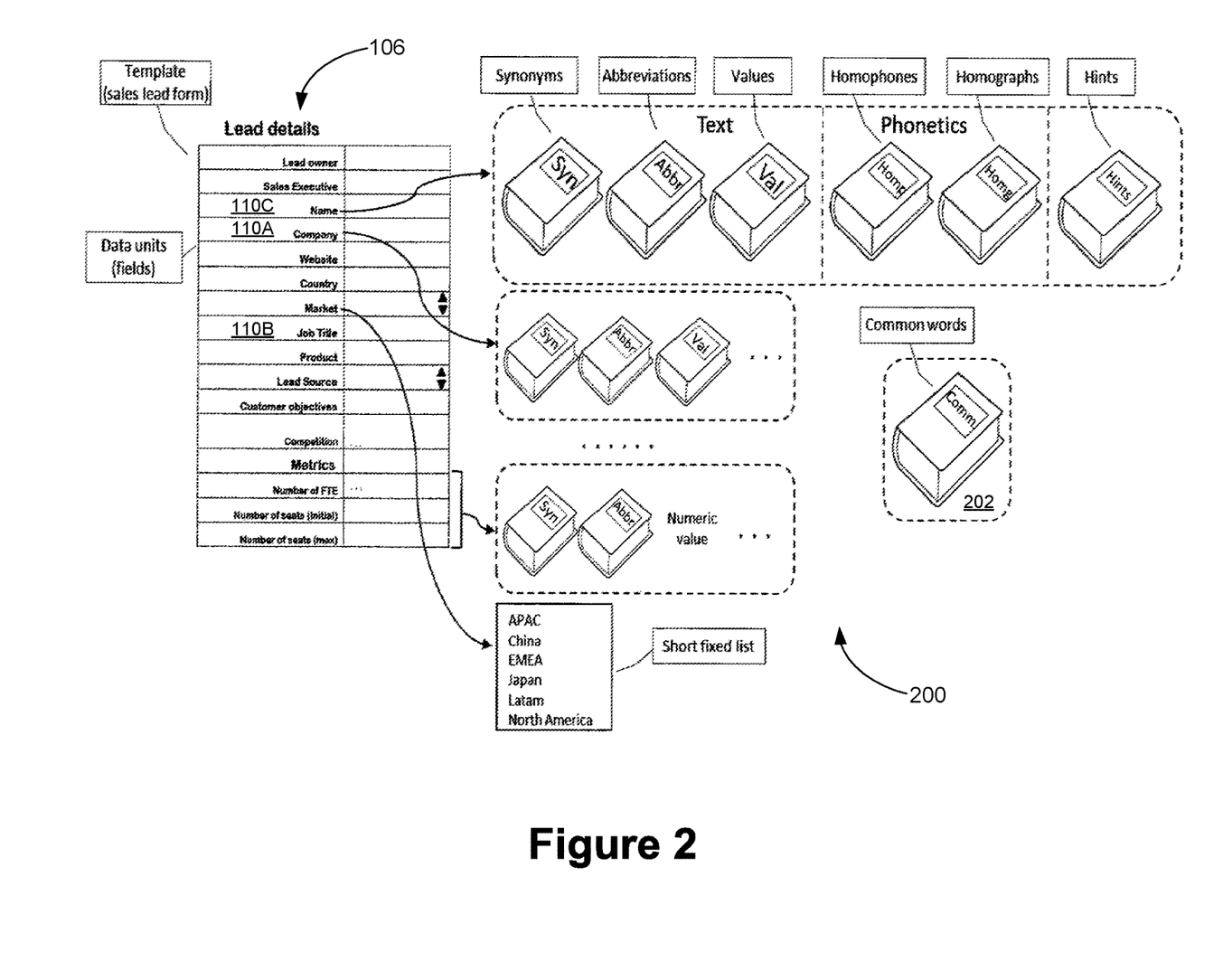
FIG. 2 schematically illustrates building of a lexical and phonetic space for a template of structured dataset.
Figure 3:
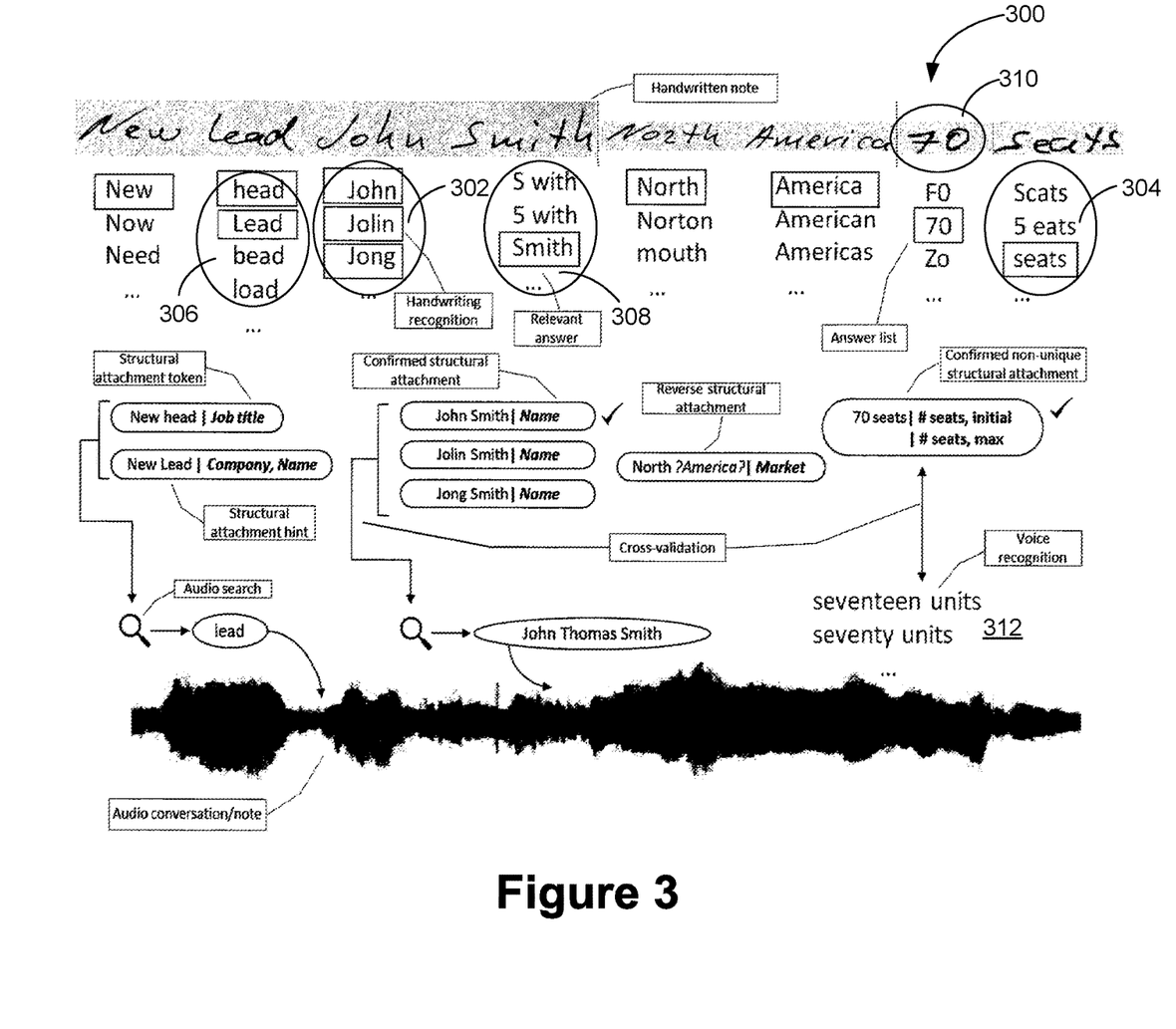
FIG. 3 is a schematic illustration of identifying structural attachment scenarios.
Figure 4:
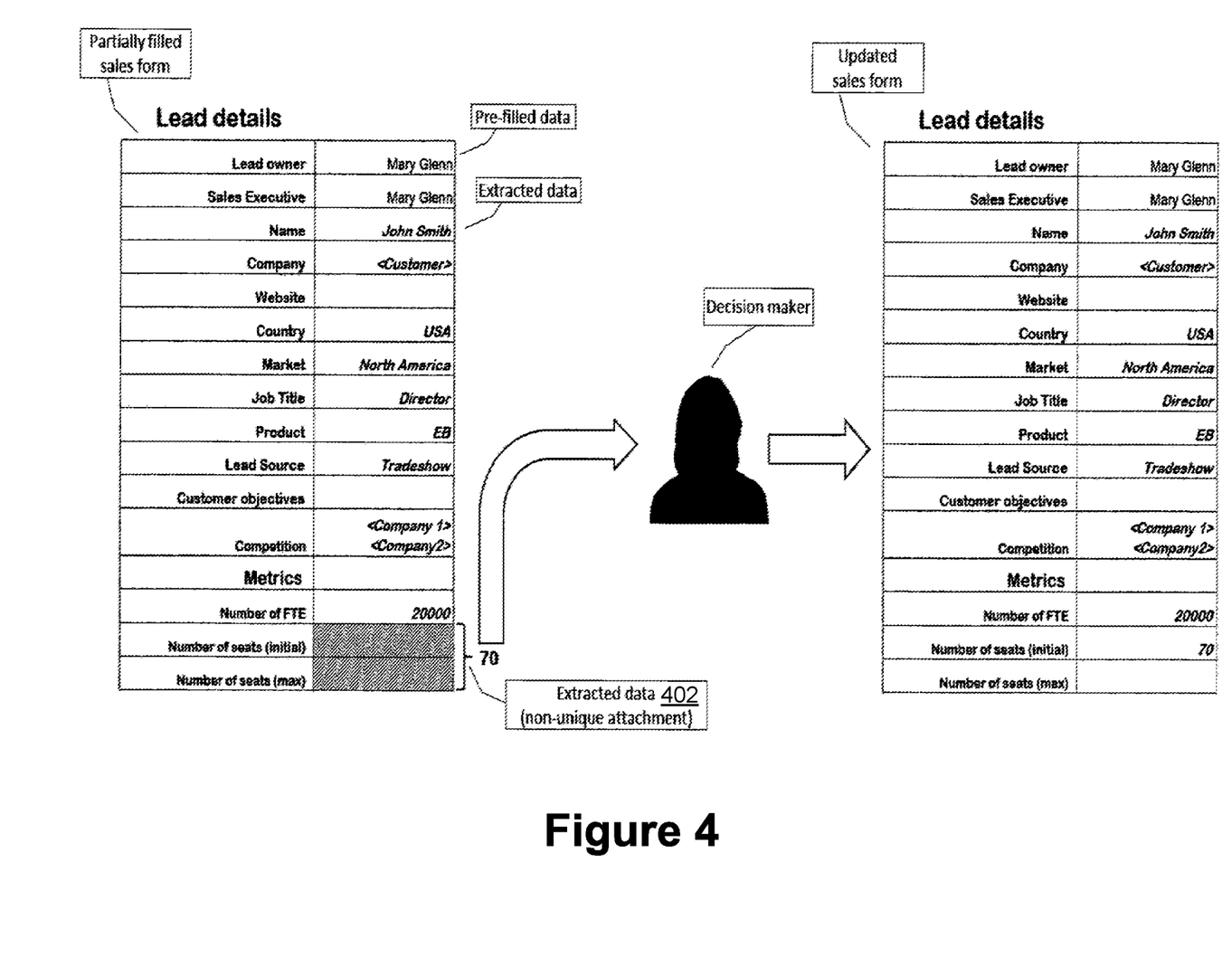
FIG. 4 is a schematic illustration of completed structured templates with manual resolution of residual conflicts.
Figure 5:
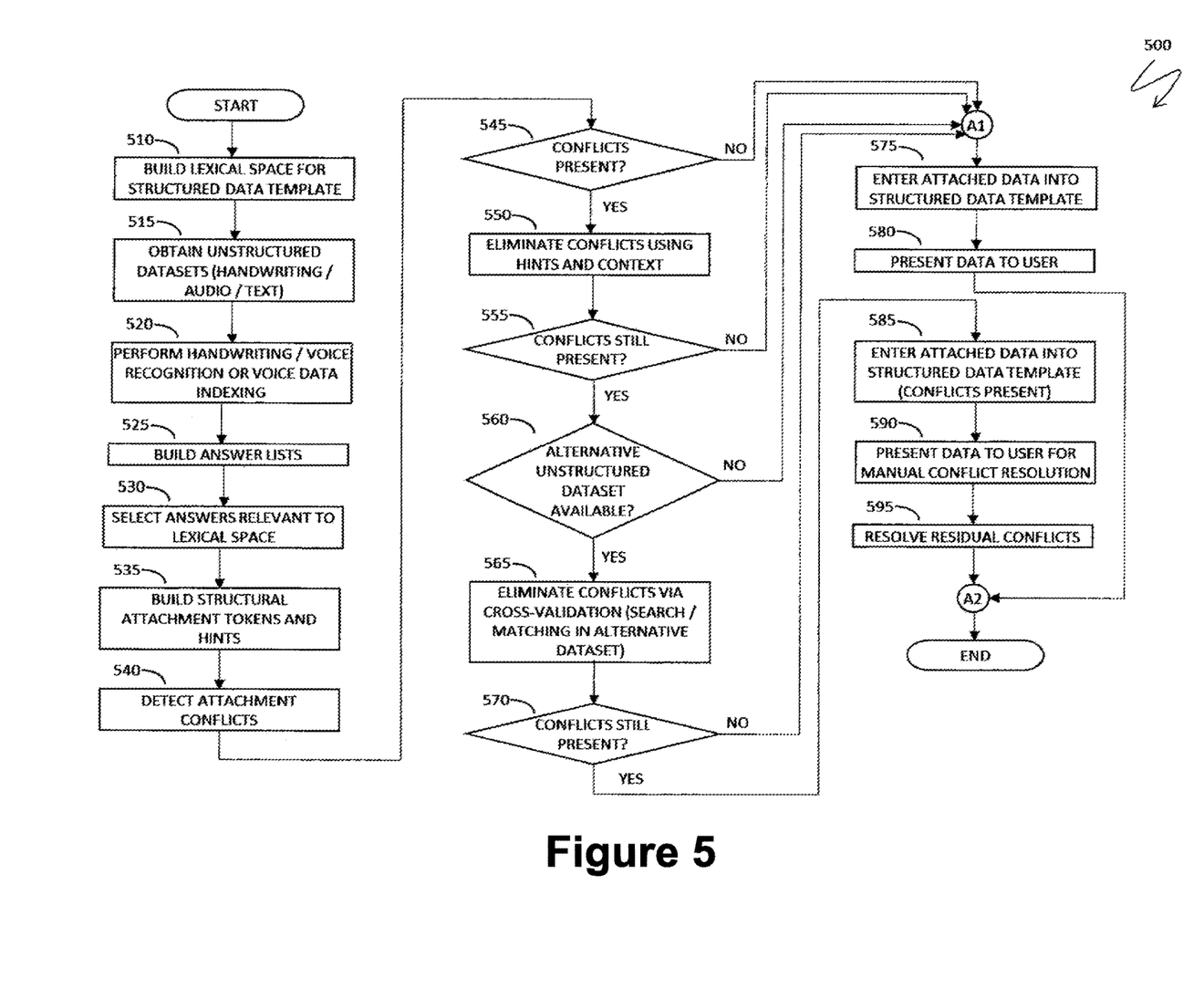
FIG. 5 is a flow chart of a method for recognizing an ambiguous term in unstructured information based on structured information in accordance with some implementations.

FIG. 1 is a schematic illustration of unstructured and structured datasets including a handwritten sales note 102, an audio sales note 104 and an information template 106. FIG. 2 schematically illustrates building of a lexical and phonetic space 200 for an information template 106 of structured dataset. FIG. 3 is a schematic illustration of a process 300 for identifying structural attachment/association scenarios. FIG. 4 is a schematic illustration of completed structured templates with manual resolution of residual conflicts. FIG. 5 is a general system flow diagram 500. More details on these figures are discussed further with respect to FIGS. 5 and 6.

The proposed system includes the following steps for completion of structured data templates 106 using unstructured information from handwritten and audio sources (e.g., the handwritten sales note 102 and the audio sales note 104).

1. Referring to FIG. 2, a structured data template 106 is analyzed and a lexical and phonetic space 200 for each data unit 108 in a template (e.g. a form field 112) is created. It may include a field name 110 with synonyms and abbreviations and potential values of a field, also with abbreviations, as well as homographs and homophones for processing and disambiguating voice recognition information. For example, a Company field 110A in a sales lead form (indicating a customer) 106 may be included in a lexical space 200 with the synonyms Organization and Corporation and with the abbreviations comp., org. and corp. A vocabulary of values for that field may include a list of company names based on Dun & Bradstreet databases and other sources of company information.

An important lexical data type for conversion is represented by short fixed lists, such as menu entries 114. A vocabulary of field names and other general words that may serve as hints preceding or following relevant structured information forms a vocabulary of hints for each lexical space. For example, a field name company 110A or its synonym corp. in a handwritten note may precede or follow a specific company name associated with that field, while a general word lead in a sales lead form is likely to be followed by a personal or company name or a job title 110B in the same sentence.

Lexical spaces 200 for various data units 108 in a template 106 may include duplicate data and cause potential ambiguities and needs for disambiguation. Thus, a word Newton may represent first or last personal name, multiple geographic locations or may be part of a company name. Similarly, an abbreviation st. may be used for Street or Seats (a sales metric).

Additionally, a vocabulary of common words 202 that are perceived neutral to any of the created lexical spaces may be built for speeding up processing.

General vocabularies may be augmented by custom company-wide vocabularies and by dynamic user vocabularies formed on the basis of learning user terminology which may deviate from conventions.

2. Referring to FIG. 3, handwritten and audio sources representing unstructured information are recognized and multi-variant lists of answers are created for each recognized term (word), accompanied by segmentation information. For example, a handwritten personal name "John" may have a list of answers 302 (John, John, Jong), while a word "Seats" written in separate handwritten letters with a large space between the first and the second letter may have recognition variants 304 (Scats, 5 eats, seats) in its answer list. Sometimes, especially in voice recognition, segmentation may be highly variable and dynamic, so that, instead of answer lists, generated answer variants may be better suitable for search.

3. Answer lists in each source (or only in one type of sources, for example, in handwritten notes) are scanned; common words are excluded; relevant terms in each answer list, found in one or more lexical spaces 200, are identified. For each relevant term, a structural attachment token is created, while a hint gives rise to a structural attachment hint.

Because of multi-variant answer lists, one and the same position in a recognized handwritten or audio source may generate both a structural attachment token and a structural attachment hint or even multiple copies of one or both entities. Thus, a handwritten word recognized as an answer list 306 ( . . . , lead, head, . . . ) may initiate a structural attachment token for a field Job Title 110B or Position with the answer head (anticipating a title head of . . . ) and a hint token with the answer lead explained in #1 above.

When a term from a short menu list 114 is recognized, the system may automatically identify a field name 110 via reverse lookup; if the term is composite (e.g., several words in a menu entry), the system forms a reverse structural attachment token and anticipates a continuation of the term until the menu item and the corresponding data unit (field) can be sufficiently reliably recognized. The technique of reverse structural attachments may be expanded to automatic identification of forms to which specific fields belong and re-interpreting unstructured data by adjusting the context and the lexical spaces based on the identified form.

4. The system moves forward with the previously present and new structural attachment tokens and hints, expanding, verifying and deleting them. For example, an above-mentioned answer list 302 (John, John, Jong) causes creation of three structural attachment tokens for a field Name (110C); if this answer list 302 is immediately followed by an answer list 308 (S with, 5 with, Smith) (caused by a handwritten pattern of a user who writes a capital letter S separated by a large blank space from the rest of the word), each of the three structural attachment tokens will be expanded with the third answer, so the Name structural attachment tokens will become <John Smith>, <John Smith>, <Jong Smith>.

Simultaneously, adjacent and preceding tokens and hints may be modified, so that, for example, fragment of a phrase <lead><John Smith>, where <lead> was a hint will be modified to drop the hint, while in a variant <head><John Smith> (where lead and head have been part of the same answer list and the <head> is a Job Title structural attachment token, the token will also be dropped.

5. For additional verification, the system may use cross-validation via search or matching in a parallel source. For example, if an original analysis of a handwritten note 102 for a sales lead has a structural attachment token, its components, such as numerals, may be searched or matched against a recording of an original conference call with a customer. In this way, for example an illegible writing of a number "70" (310) may be verified by search or matching with an audio note that may return phonetic answer variants 312 (seventeen, seventy), so the cross-validation confirms the number 70.

6. Referring to FIG. 4, if all structural attachment conflicts are resolved at the data analysis steps 2-5, a partially or fully completed form may be stored for future use. Otherwise, conflicting or ambiguous data for some of the fields, potentially leading to different interpretations, may be presented to a decision maker with highlighted choice options for finalization.

FIG. 5 is a flow chart of a method 500 for recognizing an ambiguous term in unstructured information based on structured information in accordance with some implementations. The method 500 is implemented at a computer system having one or more processors and memory including one or more programs executed by the one or more processors. The computer system builds (510) a lexical space for structured data template, and obtains (515) unstructured datasets (e.g., one or more terms in a handwritten note 102 or an audio note 104). The computer system performs (520) handwriting or voice recognition and voice data indexing. Answer lists are built (525) for relevant terms. For example, a first term of the one or more terms may be ambiguous, and is associated with a plurality of candidate terms. Answers relevant to the lexical space are selected (530) for the relevant terms. Stated another way, an answer term is selected from the plurality of candidate terms in accordance with contextual information (also called hint) provided by the structured data template, and used to defined a form field of the structured data template.

Structural attachment tokens and hints are built (535) to associate the relevant terms of the unstructured dataset with the form fields of the structured data template. One or more attachment/association conflicts may be detected (540). If one or more conflicts are detected during the course of associating the relevant terms of the unstructured dataset with the form fields of the structured data template, such conflicts are eliminated (550) using hints and context. If the conflicts cannot be eliminated (555) and there is alternative unstructured dataset available, the conflicts are eliminated (565) via cross-validation, e.g., search and matching using the alternative unstructured dataset. If the conflicts are still not resolved (570), the answer terms recognized from the relevant terms of the unstructured dataset are entered (585) into corresponding form fields of the structured data template with the conflicts present. The computer system presents (590) the structured data template to a user for manual conflict resolution, such that any residual conflict may be resolved (595) by the user.

Alternatively, if there is no conflict present or conflicts can be resolved in any of operations 545-570, the answers recognized from the relevant terms are entered (575) into the corresponding form fields of the structured data template, and the structured data template is then presented (580) to a user.

Figure 6:
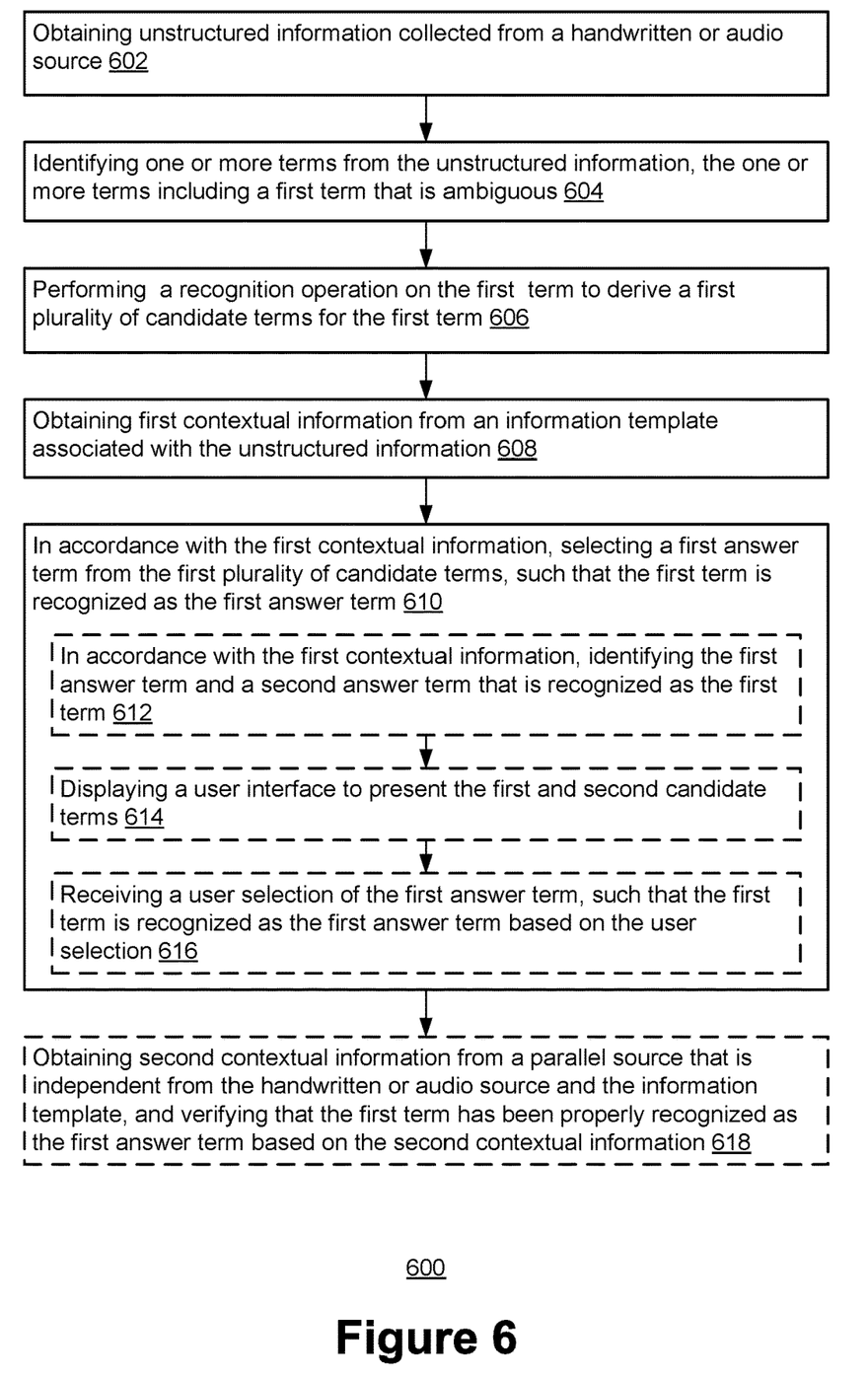
FIG. 6 is a flow chart of a method for recognizing an ambiguous term in unstructured information in accordance with some implementations.

FIG. 6 is a flow chart of a method 600 for recognizing an ambiguous term in unstructured information in accordance with some implementations. The method 600 is implemented at a computer system having one or more processors and memory storing one or more programs executed by the one or more processors. The computer system obtains (602) unstructured information collected from a handwritten or audio source, and identifies (604) one or more terms from the unstructured information. For example, the unstructured information includes one of a handwritten sales note 102 and an audio sales note 104. Handwritten terms (e.g., "CES tradeshow," "70" and "seats") are identified in the handwritten note 102. Similarly, audio sales notes 104 are segmented to identify one or more audio units as the one or more terms.

The one or more terms include a first term that is ambiguous. The computer system performs (606) a recognition operation on the first term to derive a first plurality of candidate terms for the first term. In some implementations, the first plurality of candidate terms are corresponding to different segmentations or recognitions of the first term. Examples of the first term include "John" and "Smith" in the handwritten note 102. As explained above, "John" may be recognized as more than one candidate term 302, such as John, John and Jong, and "Smith" may also be recognized as more than one candidate term 308, such as S with, 5 with and Smith.

The computer system (608) obtains first contextual information from an information template (e.g., sales form 106) associated with the unstructured information, and in accordance with the first contextual information, selects (610) a first answer term from the first plurality of candidate terms, such that the first term is recognized as the first answer term. The first contextual information functions as a hint for recognizing the first term as the first answer term.

In some implementations, the first contextual information includes a plurality of predetermined contextual options. The first answer term at least partially matches one of the plurality of contextual options, and other candidate terms of the first plurality of candidate terms do not match any of the plurality of contextual options. For example, the plurality of predetermined contextual options associated with the first contextual information include John, Mary and Linda. When "John" is tentatively recognized as the candidate terms 302 including John, John and Jong, it is determined that the first answer term is John in accordance with the plurality of predetermined contextual options of John, Mary and Linda.

In some implementations, the first answer term partially matches one of the plurality of contextual options, e.g., have a predetermined similarity level with one of the plurality of contextual options while the predetermined similarity level exceeds a similarity threshold. For example, the plurality of predetermined contextual options associated with the first contextual information include Johnson, Mary and Linda. When "John" is tentatively recognized as the candidate terms including John, John and Jong, it is determined that the first answer term is John because John partially matches Johnson within the plurality of predetermined contextual options.

In some implementations, the information template 106 further includes a plurality of data units 108, and each data unit 108 has a field name 110 and a form field 112 associated with the field name 110. Optionally, the field name 110 describes content of the form field 112, and the form field 112 optionally needs to be filled with an answer term recognized from one of the one or more terms in the unstructured information. The plurality of data units 108 further includes a first data unit. The first contextual information relates to the form field of the first data unit. Stated another way, the form field of the first data unit is configured to provide the first contextual information for recognizing the ambiguous first term in the unstructured information 102 or 104. The first answer term recognized from the first term is thereby used to define the form field of the first data unit.

Specifically, in some implementations, the form field 110 corresponds to a plurality of predefined menu entries (also called contextual options), and the first answer term at least partially matches one of the plurality of predefined menu entries. Optionally, other candidate terms of the first plurality of candidate terms do not match any of the plurality of predefined menu entries. As explained above, the first answer term may be partially or entirely match one of the plurality of predefined menu entries. Optionally, the plurality of predefined menu entries are predefined and stored in a database (e.g., Dun & Bradstreet databases). In some situations, the database is dynamically managed, such that custom company-wide vocabularies and dynamic user vocabularies are formed and included into the database on the basis of learning user terminology that deviates from conventions. Optionally, the plurality of predefined menu entries 114 includes two or more names (e.g., country names, company names).

Alternatively, in some implementations, the one of the plurality of predefined menu entries includes a name. The first answer term at least partially matches one of the plurality of predefined menu entries, when the first answer term matches the name or a variation of the name, the variation of the name including one of a group consisting of a synonym, an abbreviation, a homograph and a homophone of the name. For example, the plurality of predefined menu entries includes United States. The first answer term includes U.S., and matches an abbreviation of United States. Thus, the corresponding first term is properly recognized as U.S. in accordance with the menu entry of United States.

In some implementations, the one or more terms of the unstructured information further include a second term located in proximity to the first term in the unstructured information. The computer system selects the first answer term from the first plurality of candidate terms by recognizing the second term as a second answer term; determining that the second answer term is related to both the first contextual information and the first answer term of the first plurality of candidate terms; and in accordance with the first contextual information, recognizing the first term as the first answer term. In some implementations, a handwritten word (i.e., the second term in a handwritten note) is recognized as lead or head. The first term follows the recognized second term lead or head. The first contextual information indicates that a data unit for Job Title 110B or Job Position in the structured information is related to the recognized second term lead or head. The first term following the recognized second term lead or head is then recognized to the first answer term corresponding to a job title or a job position.

In another example, the first and second terms located in proximity to each other are "Smith" and "John" in the handwritten sales note 102, respectively. The first term corresponds to a plurality of candidate terms 308 including Smith, S with and 5 with as caused by a handwritten pattern of a user who writes a capital letter S separated by a large blank space from the rest of the word. The second term "John" is recognized as John, which has been associated with the form field related to the field name Name 110C. "John" and "Smith" are disposed in proximity and related to each other. It is then determined that the first term "Smith" is a family name of the person. The first term "Smith" is determined as Smith rather than S with or 5 with.

Further, in some implementations, the first contextual information includes a name. The second term is associated with the second answer term when the second answer term matches the first name or a variation of the name, the variation of the name including one of a group consisting of a synonym, an abbreviation, a homograph and a homophone of the name. More details on the variation of the name are discussed above with reference to the lexical and phonetic spaces 200 described in FIG. 2.

In some implementations, the first contextual information includes the field name of the first data unit. Stated another way, the field name of the first data unit is configured to provide the first contextual information for recognizing the ambiguous first term in the unstructured information 102 or 104. The first answer term recognized from the first term is used to define the form field of the first data unit. For example, the one or more terms further includes a second term located in proximity to the first term in the unstructured information. The computer system recognizes the second term as a second answer term, and determines that the form field is associated with the first term after determining that the second answer term matches the field name of the first data unit or a variation of the field name of the first data unit. The computer system then recognizes the first term as the first answer term. Optionally, the variation of the field name of the first data unit includes one of a group consisting of a synonym, an abbreviation, a homograph and a homophone of the field name of the first data unit. As such, a vocabulary of the field name or other general word may serve as hints preceding or following relevant term in the unstructured information used to define the corresponding form field.

In an example, the one or more terms of a handwritten note include "Intel Inc.," i.e., the first term "Intel" and the second term "Inc." The first term "Intel" is derived as Intel, 1 tel and 7tel. The second term "Inc." is recognized as Inc., which is an abbreviation of a synonym of the field name Company in the sales form 106. Therefore, the computer system determines that this second answer term "Inc." matches a variation of the field name Company 110A of the first data unit. The computer system then determines that the form field next to the field name Company 110A is associated with the first term "Intel." To be used as a company name, the first term "Intel" is therefore recognized as Intel, rather than 1 tel or 7tel. Similarly, in another example, a second term made of a general word (e.g., "lead") is likely to be followed by a firm term related to a personal or company name or a job title within a handwritten note.

In some implementations, in accordance with the first contextual information, the computer system identifies (612) the first answer term and a second answer term that is also recognized as the first term. The first and second answers are distinct from each other. Referring to FIG. 4, a user interface is displayed (614) to present the first and second candidate terms (i.e., extracted data with non-unique attachment 402). The computer system then receives (616) a user selection of the first answer term, such that the first term is recognized as the first answer term based on the user selection.

In some implementations, second contextual information is obtained (618) from a parallel source that is independent from the handwritten or audio source and the information template, and it is verified that the first term has been properly recognized as the first answer term based on the second contextual information. For example, a handwritten note for a sales lead is analyzed. Referring to FIG. 3, a number is recognized from the handwritten note, and searched or matched against a recording of an original conference call with a customer. An illegible writing of a number "70" (310) on the handwritten note may be verified in the audio sales note created from the original conference call, because such an audio sales note returns phonetic variation 312 (seventeen, seventy) of the number "70."

It should be understood that the particular order in which the operations in FIGS. 5 and 6 have been described are merely exemplary and are not intended to indicate that the described order is the only order in which the operations could be performed. One of ordinary skill in the art would recognize various ways to reorder the operations described herein. Additionally, it should be noted that details of processes described with respect to method 500 (e.g., FIG. 5) are also applicable in an analogous manner to method 600 described above with respect to FIG. 6, and that details of processes described with respect to method 600 (e.g., FIG. 6) are also applicable in an analogous manner to method 00 described above with respect to FIG. 5.

Figure 7:
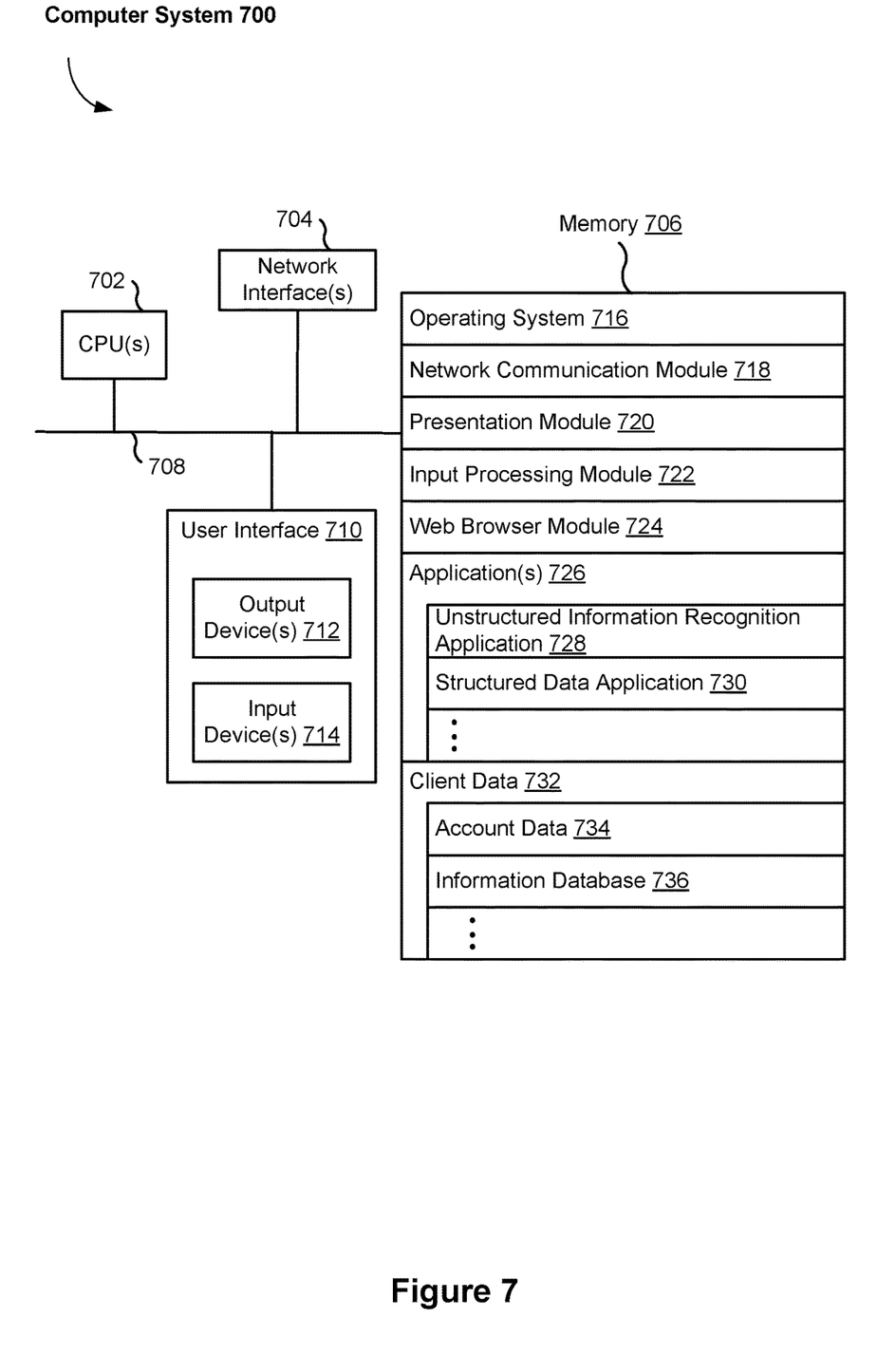
FIG. 7 is a block diagram illustrating a computer system that recognizes a term in unstructured information based on contextual information provided by structured information in accordance with some implementations.

FIG. 7 is a block diagram illustrating a computer system 700 that recognizes a term in unstructured information based on contextual information provided by structured information in accordance with some implementations. The computer system 700, typically, includes one or more processing units (CPUs) 702, one or more network interfaces 704, memory 706, and one or more communication buses 708 for interconnecting these components (sometimes called a chipset). The computer system 700 also includes a user interface 710. User interface 710 includes one or more output devices 712 that enable presentation of structured or unstructured information (e.g., the handwritten sales note 102, the audio sales note 104 and the sales form 106). User interface 710 also includes one or more input devices 714, including user interface components that facilitate user input such as a keyboard, a mouse, a voice-command input unit or microphone, a touch screen display, a touch-sensitive input pad, a camera, or other input buttons or controls. Furthermore, in some implementations, the computer system 700 uses a microphone and voice recognition or a camera and gesture recognition to supplement or replace the keyboard. Optionally, the computer system 700 includes one or more cameras, scanners, or photo sensor units for capturing images, for example, of the handwritten sales note 102. Optionally, the computer system 700 includes a microphone for recording an audio clip, for example, of the audio sales note 104.

Memory 706 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 706, optionally, includes one or more storage devices remotely located from one or more processing units 702. Memory 706, or alternatively the non-volatile memory within memory 706, includes a non-transitory computer readable storage medium. In some implementations, memory 706, or the non-transitory computer readable storage medium of memory 706, stores the following programs, modules, and data structures, or a subset or superset thereof:

Operating system 716 including procedures for handling various basic system services and for performing hardware dependent tasks;

Network communication module 718 for connecting the computer system 700 to other computer systems (e.g., a server) via one or more network interfaces 704 (wired or wireless);

Presentation module 720 for enabling presentation of information (e.g., a graphical user interface for presenting application(s) 726, widgets, websites and web pages thereof, and/or games, audio and/or video content, text, etc.) at the computer system 700 via one or more output devices 712 (e.g., displays, speakers, etc.) associated with user interface 710;

Input processing module 722 for detecting one or more user inputs or interactions from one of the one or more input devices 714 (e.g., a camera for providing an image of a handwritten sales note 102 and a microphone for capturing an audio clip of an audio sales note 104) and interpreting the detected input or interaction in conjunction with one or more applications 726;

Web browser module 724 for navigating, requesting (e.g., via HTTP), and displaying web sites and web pages thereof;

One or more applications 726 for execution by the computer system 700, including, but not limited to, an unstructured information recognition application 728 for recognizing terms in unstructured information based on hints provided by structured information and a structured data application 730 for extracting data from unstructured information and preparing a structured information form based on the extracted data;

Client data 732 storing data associated with the one or more applications 726, including, but is not limited to:

Account data 734 storing information related with reviewer accounts if the unstructured information recognition application 728 or the structured data application 730 is executed in association with one or more review accounts; and Information database 736 for selectively storing unstructured information obtained by the input devices 714 (e.g., sales notes 102 and 104), one or more terms obtained in the unstructured information, answer terms associated with the one or more terms, contextual information used to determine the answer terms, structured information (e.g., in a data template 106), variations of field names 110, menu entries 114 for one or more form fields, general and custom vocabulary that are used as contextual information, and the like.

In some implementations, the unstructured information recognition application 728 and the structured data application 730 are configured to at least partially implement the methods 500 and 600 for recognizing an ambiguous term in unstructured information based on structured information. In some implementations, the unstructured information recognition application 728 and the structured data application 730 obtain the unstructured information (e.g., the handwritten sales note 102 and the audio sales note 104) from the input devices 714 of the computer system 700. One or more cameras, scanners, or photo sensor units of the computer system 700 capture images of the handwritten sales note 102, and a microphone of the computer system 700 records an audio clip of the audio sales note 104. Alternatively, in some implementations, the unstructured information recognition application 728 and the structured data application 730 obtain the unstructured information (e.g., the handwritten sales note 102 and the audio sales note 104) from another computer system (e.g., a server, a cloud service or an electronic device) via one or more wired or wireless communication networks.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 706, optionally, stores a subset of the modules and data structures identified above. Furthermore, memory 706, optionally, stores additional modules and data structures not described above.

A person skilled in the art would recognize that particular embodiments of the computer system 700 may include more or fewer components than those shown. One or more modules may be divided into sub-modules, and/or one or more functions may be provided by different modules than those shown. In some embodiments, an individual one of computer system 700 implements or performs one or more methods described herein with respect to FIGS. 5 and 6. In some embodiments, a plurality of machines (e.g., a local computer and a remote server) together implement or perform one or more methods described herein as being performed by the computer system 700, including the methods described with respect to FIGS. 5 and 6. For example, a first computer system (e.g., a local computer or a server) obtains the unstructured information (e.g., the handwritten sales note 102 and the audio sales note 104) from another computer system (e.g., a remote computer, a server, a cloud service or an electronic device) via one or more wired or wireless communication networks. The first computer system recognizes a term in unstructured information based on contextual information provided by structured information, and uses a recognized answer term to define one or more form fields of the structured information. More details on recognition of an ambiguous term in unstructured information are discussed above with reference to FIGS. 1-4.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, mechanical structures, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first answer term could be termed a second answer term, and, similarly, a second answer term could be termed a first answer term, without departing from the scope of the various described implementations. The first answer term and the second answer term are both answer terms, but they are not the same answer terms.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, components, structures and/or groups, but do not preclude the presence or addition of one or more other features, integers, steps, operations, elements, components, structures, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

It is noted that the computer system described herein is exemplary and is not intended to be limiting. For example, any components and modules described herein are exemplary and are not intended to be limiting. For brevity, features or characters described in association with some implementations may not necessarily be repeated or reiterated when describing other implementations. Even though it may not be explicitly described therein, a feature or characteristic described in association with some implementations may be used by other implementations.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A computer-implemented method, comprising:
   at a computer system having one or more processors and memory storing one or more programs executed by the one or more processors:
      obtaining unstructured information collected from a handwritten or audio source;
      identifying one or more terms from the unstructured information, the one or more terms including a first term that is ambiguous;
      performing a recognition operation on the first term to derive a first plurality of candidate terms for the first term;
      obtaining first contextual information from an information template associated with the unstructured information;
      in accordance with the first contextual information, selecting a first answer term from the first plurality of candidate terms, such that the first term is recognized as the first answer term;
      obtaining second contextual information from a parallel source that is independent from the handwritten or audio source and the information template; and
      verifying that the first term has been properly recognized as the first answer term based on the second contextual information.

2. The method of claim 1, wherein the first plurality of candidate terms are corresponding to different segmentations or recognitions of the first term.

3. The method of claim 1, the first contextual information including a plurality of contextual options, wherein the first answer term at least partially matches one of the plurality of contextual options, and other candidate terms of the first plurality of candidate terms do not match any of the plurality of contextual options.

4. The method of claim 1, wherein:
   the information template further comprises a plurality of data units, each data unit having a field name and a form field associated with the field name, the plurality of data units further including a first data unit;
   the first contextual information relates to the form field of the first data unit; and
   the first answer term recognized from the first term is used to define the form field of the first data unit.

5. The method of claim 4, wherein the form field corresponds to a plurality of predefined menu entries, and the first answer term at least partially matches one of the plurality of predefined menu entries, while other candidate terms of the first plurality of candidate terms do not match any of the plurality of predefined menu entries.

6. The method of claim 5, wherein the plurality of predefined menu entries are predefined and stored in a database.

7. The method of claim 5, wherein the plurality of predefined menu entries includes two or more company names.

8. The method of claim 5, wherein the one of the plurality of predefined menu entries includes a first name, and the first answer term at least partially matches one of the plurality of predefined menu entries, when the first answer term matches the first name or a variation of the first name, the variation of the first name including one of a group consisting of a synonym, an abbreviation, a homograph and a homophone of the first name.

9. The method of claim 1, wherein the one or more terms further includes a second term located in proximity to the first term in the unstructured information, and selecting the first answer term from the first plurality of candidate terms further comprises:
   recognizing the second term as a second answer term;
   determining that the second answer term is related to the first contextual information and the first answer term of the first plurality of candidate terms; and
   in accordance with the first contextual information, recognizing the first term as the first answer term.

10. The method of claim 9, the first contextual information including a first name, wherein the second term is associated with the second answer term when the second answer term matches the first name or a variation of the first name, the variation of the first name including one of a group consisting of a synonym, an abbreviation, a homograph and a homophone of the first name.

11. The method of claim 1, wherein:
   the information template further comprises a plurality of data units, each data unit having a field name and a form field associated with the field name, the plurality of data units further including a first data unit;
   the first contextual information includes the field name of the first data unit; and
   the first answer term recognized from the first term is used to define the form field of the first data unit.

12. The method of claim 11, wherein the one or more terms further includes a second term located in proximity to the first term in the unstructured information, and selecting the first answer term from the plurality of candidate terms further comprises:

recognizing the second term as a second answer term;

after determining that the second answer term matches the field name of the first data unit or a variation of the field name of the first data unit, determining that the form field is associated with the first term; and     recognizing the first term as the first answer term.

13. The method of claim 12, wherein the variation of the field name of the first data unit includes one of a group consisting of a synonym, an abbreviation, a homograph and a homophone of the field name of the first data unit.

14. The method of claim 1, wherein selecting a first answer term from the first plurality of candidate terms further comprises:

in accordance with the first contextual information, identifying the first answer term and a second answer term that is recognized as the first term;

displaying a user interface to present the first and second candidate terms; and     receiving a user selection of the first answer term, such that the first term is recognized as the first answer term based on the user selection.

15. A computer system, comprising:

one or more processors; and memory storing one or more programs to be executed by the one or more processors, the one or more programs comprising instructions for:

obtaining unstructured information collected from a handwritten or audio source;

identifying one or more terms from the unstructured information, the one or more terms including a first term that is ambiguous;

performing a recognition operation on the first term to derive a first plurality of candidate terms for the first term;

obtaining first contextual information from an information template associated with the unstructured information;

in accordance with the first contextual information, selecting a first answer term from the first plurality of candidate terms, such that the first term is recognized as the first answer term;

obtaining second contextual information from a parallel source that is independent from the handwritten or audio source and the information template; and         verifying that the first term has been properly recognized as the first answer term based on the second contextual information.

16. The computer system of claim 15, wherein the instructions for selecting a first answer term from the first plurality of candidate terms further comprises instructions for:

in accordance with the first contextual information, identifying the first answer term and a second answer term that is recognized as the first term;

displaying a user interface to present the first and second candidate terms; and     receiving a user selection of the first answer term, such that the first term is recognized as the first answer term based on the user selection.

17. A non-transitory computer readable storage medium storing one or more programs configured for execution by a computer system, the one or more programs comprising instructions for:

obtaining unstructured information collected from a handwritten or audio source;

identifying one or more terms from the unstructured information, the one or more terms including a first term that is ambiguous;

performing a recognition operation on the first term to derive a first plurality of candidate terms for the first term;

obtaining first contextual information from an information template associated with the unstructured information;

in accordance with the first contextual information, selecting a first answer term from the first plurality of candidate terms, such that the first term is recognized as the first answer term;

obtaining second contextual information from a parallel source that is independent from the handwritten or audio source and the information template; and     verifying that the first term has been properly recognized as the first answer term based on the second contextual information.

18. The non-transitory computer readable storage medium of claim 17, wherein:

the information template further comprises a plurality of data units, each data unit having a field name and a form field associated with the field name, the plurality of data units further including a first data unit;

the first contextual information includes one of the field name and the form field of the first data unit; and     the first answer term recognized from the first term is used to define the form field of the first data unit.

\* \* \* \* \*